May 12, 1953
JOHN P. FRANCESCO
NOW BY JUDICIAL CHANGE OF NAME
JOHN PATSY FRANCIS
SLEEVE FASTENER
Filed Oct. 5, 1949
2,638,028
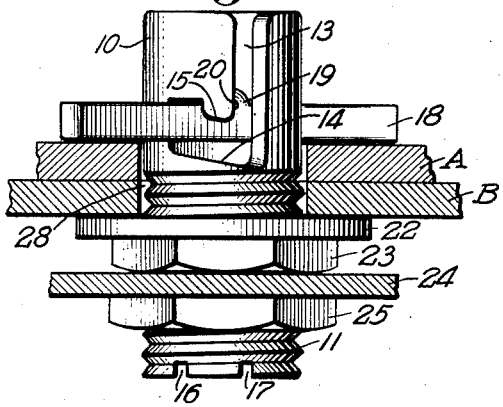
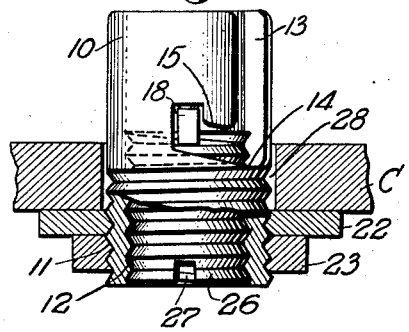
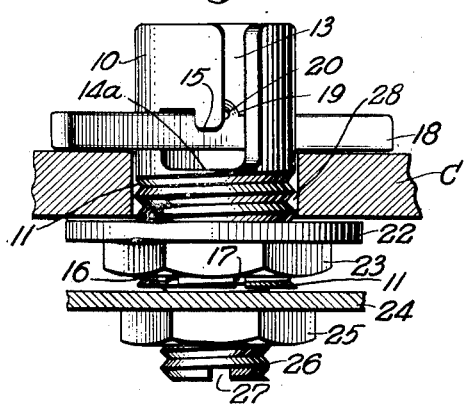
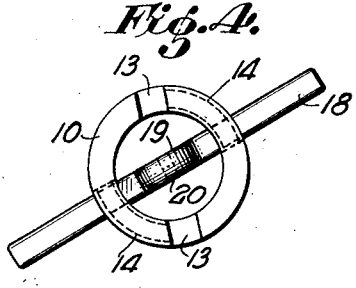
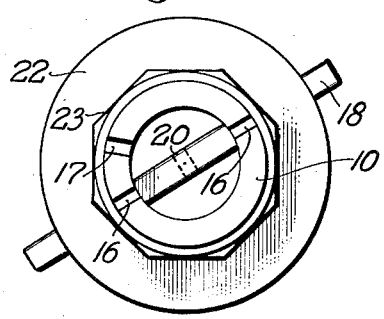
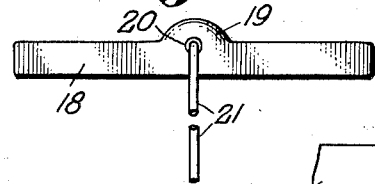
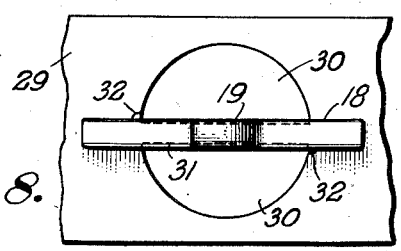
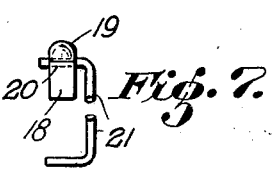
Inventor:
John P. Francesco Patented May 12, 1953

2,638,028

UNITED STATES PATENT OFFICE 2,638,028

SLEEVE FASTENER

John P. Francesco, Haverhill, Mass., now by judicial change of name John Patsy Francis Application October 5, 1949, Serial No. 119,722

2 Claims. (Cl. 85—3)

This invention relates in general to a sleeve fastener and is more particularly described as a device applicable from one side only through an opening in a plate, a wall, or another article, for sealing leaks, as a connector, for attaching similar or unlike articles together, supporting fixtures from a wall, and for many other uses both temporary and permanent.

An important object of the invention is to provide a fastener which is insertable from the front through a hole in an article or a plurality of articles with locking means insertable at the back of the articles, and to engage the back thereof, and when the fastener is drawn up at the side from which it is inserted, to clamp the sleeve thereto, and to clamp a plurality of articles or plates together when the fastener is inserted through openings in a plurality thereof.

A further object of the invention is to provide a sealing plug in a sleeve fastener for a wall, plate, or tank, to close an opening therein, or to prevent a leak, by applying the sleeve fastener from the outer side of the said wall, plate, or tank.

A still further object of the invention is to provide improvements and structural refinements in a sleeve fastener adaptable as a connector, more specifically connector nipple assemblies such as are commonly employed for connecting pipes or tubes to fluid tanks, boilers, barrels, and similar enclosures.

Another object of the invention is to provide a fastener that is attached to a plurality of plates, frames, ribs, channel bars, or other objects, and secured thereto, with the longitudinal opening within the sleeve open for inspection at all times.

Still a further object of the invention is to provide a locking means for attaching the sleeve to an article which is simple in construction, easy to install and remove, cheap to manufacture, durable, and accessible thereto for inspection of said locking means.

Other objects of the invention will appear in the specification and will be apparent from the accompanying drawings, in which, Figure 1 is an elevation view of a sleeve fastener in accordance with this invention applied to several thicknesses of material;

Figure 2 is a sectional elevation of a sleeve fastener attached to a wall plate and used for sealing leaks with the threaded plug attached within the sleeve;

Figure 3 is an elevation view of a sleeve fastener in accordance with this invention applied to a wall plate with an article secured to the threaded plug of the sleeve;

Figure 4 is a top view of the sleeve with the locking bar in maximum locking position within the locking extensions of the said sleeve;

Figure 5 is an end view of the fastener with the locking bar in maximum locking position, as shown by the opposite indicating marks on the sleeve;

Figure 6 is a side elevation of the locking bar with a holding rod attached thereto;

Figure 7 is an end elevation of the locking bar with a substantially U-shaped holding rod attached thereto; and Figure 8 is a top view of a locking bar tack-welded to a plate and also a cross bar formed in said plate.

Fasteners of various kinds are commonly used in attaching sheet materials together and supporting them and other articles by means of projections extended at inaccessible rear ends after inserting the fasteners through openings accessible only from the front, or from one side. While the present invention is of this general type, a new and improved construction and method is utilized in inserting the locking bar with a simple removable holder through an opening and at the back of the article through which it is inserted and holding the said bar and applying the sleeve thereto with the washer and nut thereon for securing the said fastener to the article to which it is applied.

Referring now more particularly to the drawings, a sleeve 10 is provided with external threads 11 at the outer end to engage one or more nuts 23 and 25, as shown in Figure 1. The nut 23 with a washer 22 forms an adjustable abutment on the plate B upon insertion of the sleeve 10 within the opening 20 of the plates A and B.

In oposite sides of the sleeve 10 are longitudinal slots 13 with said slots 13 extending from the end of the inner end of the sleeve 10, and each of said slots 13 having a locking extension 14 at slightly less than a right angle from its slot 13 and in the direction of the inner end of the sleeve, as shown in Figures 1 and 2.

The locking extensions 14a, as shown in Figure 3, is substantially parallel with the locking bar 18. The locking extensions 14 and 14a are located at a substantial distance from the threaded end 11 to receive therebetween the plates or other material to which the sleeve 10 is applied for fastening.

The sleeve 10 is threaded externally 11 and internally 12, as shown in Figure 2, with longitudinal slots 13 in opposite sides of the sleeve and lateral locking extensions 14 therefrom and at an angle toward the inner end of the sleeve.

The shoulders 15 of the locking extensions 14 and 14a prevents the locking bar 18 from disengaging the locking position in the event of a slight contraction of the wall, vibrations, or accidental failure to fully adjust the nut 23 in securing the sleeve 10 to the plates A and B, or to the wall plate C.

In securing the sleeve 10, a locking bar 18, as shown in the various figures and more particularly in Figures 6 and 7, is used in engaging the slots 13 and locking extensions 14 of the said sleeve. To prevent a possible rolling action of the locking bar and also to obtain greater strength and longitudinal clearance by increasing the vertical height only, in my embodiment I have shown a substantially rectangular shaped bar having a shoulder 19 in approximate center of the said bar. The shoulder 19, within the sleeve 10, as shown in Figures 1, 3 and 4, limits the placing of said locking bar in a transverse position to the longitudinal axis of the sleeve, thus maintaining substantially equal portions extending from the sleeve with the said shoulder 19 preventing any possible loss of the said locking bar, more so when inserted or removed to and from a vertical locking position. To further prevent any possible loss and also axial and transversal movement of the locking bar, a threaded plug 26 is used, Fig. 2, more so when the nut 23 is loosened.

An aperture 20 on the locking bar 18, as shown in Figures 6 and 7, is used for inserting the said locking bar within the opening 28 of the plates A and B or wall plate C by attaching to the said bar a substantially U-shaped holding rod member 21. This holding rod 21 is used to insert the locking bar 18 by placing the said bar parallel to the said holding rod and inserting the locking bar and holding rod within the opening 28 of the plates A and B or C. Upon engagement of the locking bar at the back of plate A or C the sleeve 10 with the washer 22 and nut 23 loosely applied thereto is inserted within the opening 28 with the holding rod 21 extending through the outer end of the said sleeve. The outer free lateral end of the holding rod 21 is held while the slots 13 of the sleeve 10 are engaging the locking bar 18. The locking bar is then rotated until the locking extensions are fully engaged with the locking bar whereupon the nut 23 is tightened on the end threads 11 and the holding rod 21 is then withdrawn from the sleeve. It is to be understood that the locking bar is axially movable to engage or disengage the locking extensions instead of rotating the sleeve.

In Figure 5 is shown the opposite indicating marks 16 on the outer end of the sleeve 10 indicating that the locking bar 18, as shown, is at its maximum locking position within the locking extensions 14 of the said sleeve. When the locking bar 18 is in line with the indicating mark 17 the said bar is then in unlocked position within the longitudinal slots 13 of the sleeve, thus permitting the removal of the said sleeve from the locking bar and the plates A and B or other object to which it is attached.

To seal leaks in tanks, boilers, barrels, and similar enclosures, a threaded plug 26, as shown in Figure 2, is adapted to engage the inside threads 12 of the sleeve, and is rotatably adjustable therein by a screw driver engaging in end slot 27.

In sealing leaks the sleeve 10 is attached to the locking bar 18 through an opening 28 within the plate C and secured thereto. To insure proper sealing of the leak, washers or gaskets of metal or rubber are commonly inserted between the contacting surfaces, between the nut 23 and the outer surface of the plate in a well known manner, and depending upon the substances to be sealed or contained.

The threaded plug 26 is coated with a substance such as cement, pitch, paste, or other hardening or setting material as a means in sealing the sleeve within, with the said plug being of a suitable length and with one or more of said plugs inserted within the said sleeve as sealing means.

In Figure 1 is shown my sleeve fastener attached to a plurality of plates A and B with the locking bar 18 at the back of plate A and fastening means comprising a washer 22 and nut 23 abutting the outer wall of plate B, with a plurality of plates thus fastened together. An article or object 24 is then attached to the sleeve 10 and secured thereto by a second nut 25, as shown, thus providing a hollow sleeve for inspection thereof and also for the entry of electrical wiring, cables, tubes, or other articles capable of being entered through the longitudinal opening within the sleeve 10.

It is to be understood that the sleeve 10 may be sealed, if desired, by inserting the threaded plug 26, as shown in Figure 2, and removed therefrom for inspection within the hollow sleeve when no wiring, cables, or other materials are inserted within the said hollow sleeve.

In Figure 8 I have shown a modified form of pre-attaching the locking bar 18 to a plate 29 having an opening therein or a plurality of openings 30, thus forming a cross bar 31 within the said plate. The openings 30, substantially less than half of the total opening, provides a cross bar 31 formed by the stamping or cutting out of the two openings 30. This cross bar 31 is used for engaging the longitudinal slots 13 and locking extensions 14 of the sleeve 10 for securing the said sleeve thereto.

When the thickness of the plate limits the strength of the cross bar 31 the locking bar 18 is tack-welded 32 or secured thereto by clips or other means to reinforce the said cross bar 31 or a complete circular hole is made in the plate and the locking bar 18 secured thereto thus eliminating the said cross bar.

In Figure 7 I have shown a substantially U-shaped holding rod 21 for attaching thereto the locking bar 18 for insertion within an opening of a plate or wall and for securing at the back thereof. It is to be understood that an L-shaped or substantially similar shaped holding rod may be used.

To withdraw and remove the sleeve fastener, the applying procedure is reversed; the threaded plug 26, if one is used, is removed, the holding rod 21 is then attached to the locking bar 18, the nut loosened, and the sleeve rotated in a reverse procedure to disengage from the locking extensions 14 the said locking bar. The sleeve is then withdrawn upon entry of the locking bar 18 within the longitudinal slots 13 with the said locking bar as the last element to be withdrawn. The entire fastener upon withdrawal may be re-used for further use as desired.

In using the sleeve fastener as a connector such as are commonly employed for connecting pipes or tubes to fluid tanks, boilers, and similar enclosures, the device is secured within the opening thereof and the outer surface of the sleeve sealed in a well known manner, employing a rubber gasket and a sealing compound therewith. The pipe or tube (not shown) is attached externally or internally to the threaded end 11 or 12 of the sleeve 10 with the hollow longitudinal opening within the sleeve permitting the flow of fluid therethrough.

Briefly stated, my device has a number of uses: as a fastener for securing plates and also objects thereto in clamping engagement; as an article fastener having a longitudinal opening for access to the inner end thereof; as a fluid sealing device; and as a connector nipple assembly for the passage of fluid therethrough.

It is believed that the numerous advantages and use of the invention will be clearly understood from the foregoing disclosure and accordingly, further description thereof is considered unnecessary.

While in the foregoing there has been shown and described the preferred embodiment of this invention it is to be understood that minor changes in the details of construction, combination and arrangement of parts may be resorted to without departing from the restrictions or limitations of the invention as claimed.

The invention described herein may be manufactured and used by or for the Government of the United States of America for governmental purposes without the payment of any royalties thereon or therefor.

I claim:

1. A sleeve fastener adapted to be applied from one side of an article, comprising a hollow sleeve with external threads at one end and opposite substantially straight longitudinal slots extending from the end of the opposite end and connected with lateral locking extensions disposed within a range between a right angle to slightly less than a right angle therefrom, a separable substantially rectangular shaped locking bar provided with a central transverse aperture adapted to engage a removable holding rod whereby the said bar is adjustably movable axially and transversely within said laterally disposed locking extensions, said locking bar adapted to be pivotally inserted through an opening in an article from one side thereof and held engaging the other side of the article by a removable holding rod engaging the said central transverse aperture of said locking bar, the opposite substantially straight longitudinal slots of the sleeve engaging the said locking bar upon attaching the said sleeve thereto and said locking bar further engaging the laterally disposed locking extensions upon either rotation of the said sleeve or upon axial movement of said locking bar, and a nut threaded on the outer end of the sleeve to provide an adjustable abutment in clamping said sleeve fastener and to resist retrograde axial and transverse movement of the locking bar whereby the removable holding rod is then disengaged from the central transverse aperture of said locking bar.

2. A sleeve fastener adapted to be applied from one side of an article, comprising a hollow sleeve internally and externally threaded at one end and having opposite substantially straight longitudinal slots extending from the end of the opposite end and connected with lateral locking extensions disposed within a range between a right angle to slightly less than a right angle therefrom, a separable substantially rectangular shaped locking bar provided with a central transverse aperture adapted to engage a removable holding rod whereby the said bar is adjustably movable axially and transversely within said laterally disposed locking extensions, said locking bar adapted to be pivotally inserted through an opening in an article from one side thereof and held engaging the other side of the article by a removable holding rod engaging the said central transverse aperture of said locking bar, the opposite substantially straight longitudinal slots of the sleeve engaging the said locking bar upon attaching the said sleeve thereto and said locking bar further engaging the laterally disposed locking extensions upon either rotation of the said sleeve or upon axial movement of said locking bar, a nut threaded on the outer end of the sleeve to provide an adjustable abutment in clamping said sleeve fastener and to resist retrograde axial and transverse movement of the locking bar whereby the removable holding rod is then disengaged from the central transverse aperture of said locking bar, and a threaded plug member rotatably inserted within the outer end of the sleeve to abut said locking bar to seal the inside of the sleeve and to resist retrograde axial and transverse movement of said locking bar when the nut is loosened.

JOHN P. FRANCESCO.

References Cited in the file of this patent

UNITED STATES PATENTS

| Number | Name | Date |
| --- | --- | --- |
| 1,286,320 | Hood | Dec. 3, 1918 |
| 1,531,072 | Cardinal | Mar. 24, 1925 |
| 1,794,386 | Miller | Mar. 3, 1931 |
| 1,955,740 | Dzus | Apr. 24, 1934 |
| 2,037,347 | Shoop | Apr. 14, 1936 |
| 2,293,581 | Whitesell | Aug. 18, 1942 |
| 2,408,366 | Boyer | Oct. 1, 1946 |
| 2,421,015 | Davidson | May 27, 1947 |
| 2,449,869 | Watson | Sept. 21, 1948 |
| 2,572,022 | Francesco | Oct. 23, 1951 |
| 2,597,857 | Francesco | May 27, 1952 |